3,522,328
MODIFIED POLYESTER COMPOSITIONS CONTAINING POLYAMIDES PREPARED FROM AROMATIC DIAMINES
John R. Caldwell and Russell Gilkey, Kingsport, Tenn., assignors to Eastman Kodak Company, Rochester, N.Y., a corporation of New Jersey
No Drawing. Filed Oct. 11, 1967, Ser. No. 674,645
Int. Cl. C08g 41/04
U.S. Cl. 260—857          2 Claims

ABSTRACT OF THE DISCLOSURE

A polyester composition having one or more improved properties such as dyeability, stability and stiffness, comprising a polyester component blended or reacted with a polyamide component prepared from diamines or amino acids in each of which the amino groups are attached directly to an aromatic ring system.

---

This invention relates to modified polyester compositions having improved properties which render them especially suitable as fibers for such uses as tire cord and dyed materials, and as molding plastics. The invention further concerns the process for preparing these compositions.

Polyesters and blends of polyesters with materials such as polyamides containing aliphatic segments have found wide utility in industry. Certain characteristics however of these compositions, such as difficulty in dyeing, reduced modulus or stiffness, and susceptibility to oxidative degradation, have spurred the search for new polyesters and ways to effectively modify known ones.

Objects of the present invention therefore are: to provide polyester compositions exhibiting one or more of such properties as improved dyeability, improved modulus or stiffness, and increased stability; to provide fibers and fiber containing products from these compositions; and to provide a commercially practicable way to prepare said compositions.

These and other objects hereinafter appearing have been attained in accordance with the present invention through the discovery that certain aromatic polyamides may be blended or reacted with polyesters to provide the aforesaid compositions.

For certain rugged applications such as in tire cord, the highly desirable properties of polyamides, such as stiffness, are desired in the polyester composition. It happens, however, that the aliphatic type polyamides previously employed as modifiers react readily with the polyester in such a manner as to reduce the inherent viscosity of the polyester (often accompanied by other signs of degradation such as yellowing) to a point where the physical properties of strength, stiffness, elongation, and the like are lost.

Applicants have found, however, that polyamides prepared from diamines or amino acids in which the amino groups are attached directly to an aromatic ring system will not react with the polyester where the polyamide is not terminated with free carboxyl groups. Such blends are especially valuable for tire cord, drive belts and the like. The polyamide improves the fatigue resistance of the fiber under severe conditions of flexing, and in raising the modulus of the fiber, reduces the tendency of tires to flat spot.

For certain applications of polyester compositions such as in molding plastics, the polyester and polyamide may be made to react and form copoly(ester-amides) by employing the polyamides terminated with carboxyl groups and prepared with excess acid. These compositions, quite surprisingly retain, as in the unreacted blends, a high degree of stiffness and resistance to oxidative degradation.

The present compositions may of course contain the various additives, stabilizers, fillers, pigments and dyes useful in such compositions.

Further objects and advantages of the invention will become evident from the following description and examples.

In general, any type of fiber-forming polyester can be used in the present invention, however, the preferred polymers are those made from terephthalic acid and the polymethylene glycols such as ethylene glycol. The polyesters made from terephthalic acid and 1,4-cyclohexanedimethanol or 2,2,4,4-tetramethyl-1,3-cyclobutanediol can be used. The polyesters may contain up to 20–30 mole percent of another dicarboxylic acid such as isophthalic, o-phthalic, adipic, sebacic, azelaic, pimelic, etc. Polyesters containing 4,4'-sulfonyldibenzoic acid or naphthalenedicarboxylic acid as the principal acid can be used. Other useful types of polyesters are described in J. Poly. Sci., 54 385 (1961) and Angew. Chem., 74 606 (1962).

As to the dicarboxylic acids which may be used in accordance with our invention, any dicarboxylic acid such as those commonly employed in the art for the production of linear polyamides may be employed. Such acids are characterized by certain structural features. For example, the aliphatic dicarboxylic acids should contain at least 4 carbon atoms between the carboxyl groups. The aromatic acids contain at least 3 carbon atoms between the carboxyl groups. A wide range of alicyclic acids can be used provided that they contain at least 3 carbon atoms between the carboxyl groups.

Typical aliphatic dicarboxylic acids may be represented by the structural formula $HOOC(CH_2)_nCOOH$ wherein $n$ is 4 to 18. Branched chain acids may also be used such as 2- and 3-methyladipic, 2-ethyladipic, trimethyladipic, dimethyladipic, 3-ethylsebacic, 3-butylsuberic and 3-cyclohexylsebacic.

Typical aromatic dicarboxylic acids are isophthalic, 4-methylisophthalic, 5-tert-butylisophthalic, terephthalic, 2-methylterephthalic, the isomeric naphthalenedicarboxylic acids, etc. The carboxyl groups may be on different aromatic nuclei that are joined by a direct bond or by a divalent radical such as:

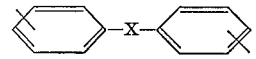

where X is a direct bond, $—CH_2—$, $—(CH_2)_2—$, $—CH(CH_3)—$, $—CH(C_2H_5)—$, $—C(CH_3)_2—$, $—O—$, $—O—CH_2—$, $—O—(CH_2)_2—O—$, $—O—(CH_2)_4—O—$, $—S—$, and $—SO_2—$.

Suitable alicyclic dicarboxylic acids include 1,4-cyclohexanedicarboxylic acid, 2,5-norcamphanedicarboxylic acid, 4,4'-dodecahydrodiphenic acid, 1,3-cyclopentanedicarboxylic acid and pinic acid.

Other types of alicyclic acids include structures such

and

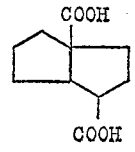

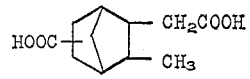

Dicarboxylic acids containing one or more ether groups can be employed such as p-phenylenedioxydiacetic acid and similar compounds described in Makromolecular Chem., 32, 1 (1959).

Mixtures of two or more dicarboxylic acids can be used as, for example, a mixture of isophthalic and terephthalic acid. In particular, mixtures of an aliphatic acid with an aromatic acid are of value. Examples of useful combinations of this type are a mixture of isophthalic acid and adipic acid and a mixture of sebacic acid and terephthalic acid. Mixtures of an aromatic acid with an alicyclic acid or an aliphatic acid with an alicyclic acid also are of value in practicing the invention.

As to the aromatic diamines which can be employed in our invention, in general any diamine which contains at least 3 carbon atoms between the amino groups can be used. Typical examples of suitable diamines are m-phenylenediamine, p-phenylenediamine, 2,4-diaminotoluene, isomeric diaminoxylene, etc. Naphthalenediamines are also useful. Likewise, compounds such as benzidine, 4,4'-methylenedianiline, and 3,4'-diaminodiphenyl can be employed. Other useful diamino compounds are listed in Belgian Pats. 565,266-8; British Pat. 871,580 and U.S. Pat. 3,006,899.

The aromatic diamines may contain one or more substituents on the aromatic ring. These substituents may be selected from the classes consisting of halogen such as chlorine and bromine; straight and branched chain alkyl radicals containing from one to 12 carbon atoms; aryl radicals containing from 6–10 carbon atoms; and alkylene aryl radicals and alkylated arylene radicals.

Aromatic amino acids that contain an amino group on an aromatic ring structure can be used. The carboxyl group may be attached to the aromatic ring or it may be separated from the aromatic ring by an alkylene group, a cycloalkylene group or an alkyleneoxy group. If the carboxyl group and amino group are present on the same aromatic ring, they should preferably be in m- or p- positions with respect to each other, as the o-amino acids tend to be less stable. The aromatic nucleus may be derived from benzene or a condensed polycyclic aromatic system such as naphthalene, phenanthrene, etc. The aromatic ring may contain substituents such as lower alkyl, phenyl and halogen. A particularly useful class of aromatic amino acids has the general structure:

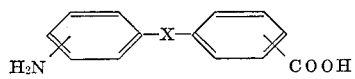

X has the structure given above.

Suitable aromatic amino acids are represented by the following: m- and p-aminobenzoic acid, 3-amino-4-methylbenzoic acid, 3-amino-5-chlorobenzoic acid, (4 - aminophenoxy)acetic acid, (3-aminophenoxy)acetic acid, 3-(4-aminophenyl)propionic acid, 4'-amino - 3 - carboxydiphenyl ether, 4'-amino - 4 - carboxydiphenyl, 4-(4-aminophenoxy)butyric acid and 4' - carboxy-4-aminodiphenylmethane.

Aromatic amino acids that contain the naphthalene nucleus are represented by: 1-carboxy-3-aminonaphthalene, 2-carboxy - 6 - aminonaphthalene, 2-carboxy-7-aminonaphthalene and (5-amino-1-naphthyloxy)acetic acid.

Polyamides may be made by heating the amino acids with tin catalysts. Mixtures of two or more amino acids may be used. In a preferred embodiment of the invention, copolyamides are made by heating a mixture of the aromatic amino acid, an aromatic diamine and a dicarboxylic acid in the presence of a tin catalyst. The aromatic amino acid may be present as a major or minor constituent in the copolyamide.

The preparation of the polyamides, using tin catalysts is described in applicants' Ser. No. 445,736 now Pat. No. 3,408,334. More specifically, these polymers may be prepared by heating the dicarboxylic acid and the diamine in substantially equimolar amounts at a temperature of 200°–350°, in the presence of a tin catalyst. An inert atmosphere must be employed. Agitation is employed in order to facilitate the removal of water from the viscous melt. Vacuum is advantageously used in the latter stages of the reaction.

In one embodiment of the invention, a salt of the dicarboxylic acid and diamine is heated in a purged, sealed vessel at a temperature of 250°–300° for 30 minutes to 3 hours in order to make a prepolymer. The tin catalyst is present during the reaction. This prepolymer is then built up to a high molecular weight by stirring the melt in vacuum. Alternatively, the prepolymer may be granulated to a particle size of 0.03 in. or smaller and heated in a vacuum or in an inert atmosphere at a temperature somewhat below the melting point. The salts are made by heating substantially equimolar amounts of the acid and diamine in aqueous alcohol or dioxane. The tin catalyst can be added at this time. An intimate mixture of the salt and catalyst is obtained by evaporating the solvent.

The polyamides can also be made in solvents such as cresol, o-hydroxydiphenyl, etc. An inert nonsolvent can be used as a heat-transfer medium, as represented by terphenyl, chlorinated diphenyl and chlorinated or alkylated naphthalenes.

The polyamides also may be made by the known methods using acid chlorides and the aromatic diamine.

In general the polyamides made from aromatic diamines by the process described above are characterized by melting points of about 250° C. or higher and by extreme thermal stability. The properties of this general class of polyamides is described in considerable detail in the prior art.

It is preferred that the polyamides melt below about 320° C. because this is the upper limit for stability of most polyesters. Polyamides melting in the desired range can be made by using an aliphatic acid or a mixture of aliphatic and aromatic dicarboxylic acids. Branched chain dicarboxylic acids are especially useful, as represented by 2-methyladipic, 3-tert-butyl-adipic, 2,5-dimethyladipic, 3-ethylsuberic and isosebacic. Acids containing a neopentyl structure are useful, as represented by dimethylmalonic and 3,3-dimethylpimelic. Polyamides melting in the desired range can also be made by using a mixture of two or more aromatic diamines, especially those containing the amino groups in a meta-position. Aromatic amino acids may also be used in conjunction with the aromatic diamines. The polyamides may have a molecular weight of about 1200 to 20,000 or higher. The preferred range is about 5000 to 15,000.

The compositions of the invention may contain from about 1 percent to 50 percent and preferably 5 percent to 30 percent by weight of the polyamide component. The blend of polyester and polyamide can be made by mixing in standard equipment such as Banbury mixers, hot rolls, screw extruders, etc. The blends are spun into fibers by the usual melt spinning methods. The fibers are subsequently drafted and heat set according to standard procedures. The blends also may be extruded in the form of sheets, rods, tubes and other shapes. In general, the fibers can be dyed with disperse and premetallized dyes. The fibers can be dyed with acid wool dyes when the polyamide contains free amino terminating groups. Dyeing can be facilitated by the use of carriers or dyeing assistants such as o-phenylphenol, dichlorobenzene, butyl benzoate, etc.

The following examples will further illustrate the invention.

EXAMPLE I

A copolyamide was made from 0.8 mole adipic acid, 0.2 mole suberic acid and 1.0 mole m-phenylenediamine. The polymer was made by heating the acids and the diamine in the presence of dibutyltin oxide catalyst and had an inherent viscosity of 0.35. Fifteen grams of the polyamide and 135 g. of poly(1,4-cyclohexylene-dimethylene terephthalate) were mixed in a screw extruder and melt spun to form fibers. The fibers were drafted and heat-set by the usual methods. They dyed well with disperse dyes and premetallized dyes. The dyes showed improved fastness toward drycleaning when compared with the unmodified polyester fiber. Fifteen grams of the polyamide and 135 g. of poly(ethylene terephthalate) were blended and the mixture was spun as described above. The fibers dyed well with disperse and premetallized dyes. The fastness toward drycleaning and laundering was improved.

EXAMPLE II

This example shows that no interchange takes place between the amine-terminated polyamide and the polyester. A copolyamide was made from 0.8 mole 1,12-dodecanedioic acid, 0.2 mole suberic acid and 1.05 moles 4,4'-methylenedianiline, using dibutyltin oxide as catalyst. When made under these conditions, the polyamide contains substantially only amino terminal groups. Five grams of the polyamide and 11.7 g. of poly(ethylene terephthalate) were stirred in a flask under nitrogen at 280° for 15 minutes. A sample of the blend was subjected to differential thermal analysis and a large crystalline melting point peak was noted at 253°. A sample of pure poly(ethylene terephthalate) gave a similar peak. The blend was treated with a mixture of 60 phenol-40 tetrachloroethane which dissolved the polyester but did not dissolve the polyamide. The polyester had an I.V. of 0.57 as compared with 0.63 for the original polyester. These results show that essentially no reaction occurred between the polyamide and the polyester. In contrast, it is shown in Netherlands application 6,410,530 that extensive reaction occurs between the polyester and polyamide when aliphatic amino compounds are used in the polyamide. A polyamide made from 0.80 mole 1,12-dodecanedioic acid, 0.2 mole isophthalic acid and excess 4,4-methylenedianiline was blended with poly(ethylene terephthalate) as described above. The results were similar and demonstrated that essentially no reaction took place between the two polymers.

EXAMPLE III

A short chain polyamide was made from 5 moles of 2-methyladipic acid and 6 moles of 2,4-toluenediamine, using a tin compound as catalyst. The polyamide had an average molecular weight of about 1400–1500 and was terminated with amino groups. (a) Three grams of the polyamide and 97 g. of poly(ethylene terephthalate) were blended in a Banbury mixer at 270–280°. The blend was melt spun to give fibers that dyed well with acid wool dyes and disperse dyes. (b) Ten grams of the polyamide was blended with 90 g. of poly(1,4-cyclohexylenedimethylene terephthalate). Fibers spun from the blend dyed well with disperse dyes, premetallized dyes and acid wool dyes.

EXAMPLE IV

The following ingredients were placed in a 100 ml. round-bottom glass flask: 4.95 g. (0.025 mole) of 4,4'-methylenedianiline, 5.75 g. (0.025 mole) of 1,12-dodecanedicarboxylic acid, and 0.01 g. of dibutyl tin oxide. The flask was fitted with a stirrer, provision for maintaining a nitrogen atmosphere over the reaction mixture, and provision for applying reduced pressure. The flask and contents were heated at 220° C. until the reactants had melted and water was evolved. The heating bath was then raised in about 15 minutes to 280° C. Heating at 280° C. with stirring in a nitrogen atmosphere was continued for 30 minutes. The pressure in the flask was reduced to about 0.05 mm. Hg over a period of 5 minutes. After stirring the polymer under vacuum at 280° C. for 30 minutes, a viscous melt was obtained. The resulting high-molecular-weight polyamide was cooled under vacuum, removed from the flask, and granulated to a particle size of 0.01 to 0.03 inch. The inherent viscosity of the polymer was 1.1.

Poly(ethylene terephthalate) having an inherent viscosity of 0.73 is prepared from dimethyl terephthalate and ethylene glycol by the well known, established procedure using zinc acetate and antimony trioxide as catalysts. It too is granulated to a particle size of 0.01 to 0.03 inch.

The two granulated polymers in a weight ratio of 3 parts polyester to 1 part polyamide (20 g. total) are placed in a flask equipped with a stirrer and provision for maintaining a nitrogen atmosphere and also for reducing the pressure. The flask is heated in a metal bath. The granulated particles are heated with stirring at a pressure of 0.3 mm. Hg at 150° C. for 1 hour to reduce the water content to less than 0.02 percent. The vacuum is released to atmospheric pressure with dry nitrogen and the polymer granules are melt blended by raising the temperature of the heating bath to 285° C. The melt is stirred for 30 minutes in order to obtain a homogeneous blend. The polyester-polyamide blend is cooled to room temperature and removed from the flask.

A determination of the melting point of the blend by differential thermal analysis shows two peaks, one at 253° C. corresponding to the polyester and the other at 266° C. corresponding to the polyamide. The inherent viscosity of the blend is 0.82. Fibers pulled from the melt can be cold drawn, are strong, and dye with disperse and premetallized dyes to commercially acceptable shades.

EXAMPLE V

A polyamide is prepared by the same procedure and using the same ingredients as those used in Example IV. The amount of 1,12-dodecanedicarboxylic acid is increased to 6.33 g. (0.0275 mole) to produce a polyamide having terminal carboxyl groups. The inherent viscosity of the resulting polyamide is 0.41. This polyamide is melt blended as described in Example IV with poly(ethylene terephthalate) having an inherent viscosity of 0.73. The time of melt blending at 285° C. is increased to 90 minutes. Under these conditions the free carboxyl end groups exchange with the polyester to form a block copoly(ester-amide). The inherent viscosity of the product is 0.67. It has a single melting point of 249° C. as determined by differential thermal analysis. Fibers melt spun from the polymer and drawn at 80° C. are strong, have an elastic modulus of 70 g./den., and dye with disperse and premetallized dyes to deep shades.

EXAMPLE VI

A polyamide is prepared from molar equivalent amounts of 4,4'-oxydianiline and isophthalic acid by the procedure described in Example IV. The inherent viscosity of the polyamide is 0.68. It is melt blended with an equal weight of poly-1,4-cyclohexylenedimethylene terephthalate having an inherent viscosity of 0.74 by mixing granulated particles of the thoroughly dried polyamide and polyester and extruding in a Brabender extruder at 295° C. at a speed of 10 r.p.m. Fibers spun from the polyesterpolyamide blend dye well with disperse and premetallized dyes. They retain a high modulus even up to 110° C. Similar results were obtained using a polyester made from 0.9 mole terephthalic acid, 0.1 mole sebacic acid and ethylene glycol.

EXAMPLE VII

A polyamide is prepared from molar equivalent amounts of 4,4'-oxydianiline and azelaic acid by the procedure described in Example IV. The polyamide is precipitated as a fine powder by addition of 50 percent aqueous acetone to a solution of the polymer in a solvent mixture consisting of 90 weight percent dimethylacetamide and 10 weight percent lithium chloride. Five weight percent of the polyamide powder is blended with poly-1,4-tetramethylene terephthalate in a Brabender extruder at 250° C. The polyamide is dispersed in the polyester in a particulate state having an average diameter of 5 microns. Fibers spun from this polyester-polyamide blend have improved dyeability with disperse and premetallized dyes.

EXAMPLE VIII

A polyamide is prepared from molar equivalent amounts of benzidine (4,4'-diaminodiphenyl) and azelaic acid. A copolyester is prepared having 75 mole percent poly-1,4-cyclohexylenedimethylene terephthalate units and 25 mole percent poly-1,4-cyclohexylenedimethylene hexahydroterephthalate units. The polyamide and polyester are melt blended in a screw extruder at a temperature of 290° C. and in an atmosphere of nitrogen with a residence time in the screw of 10 minutes. Both polymers are dried thoroughly before melt blending and are blended in the ratio of 4 parts by weight of polyester to 1 part by weight of polyamide. Fibers melt spun from this blend have good dyeability with disperse and premetallized dyes. They have a higher modulus and improved resilience when compared with the unmodified polyester. This composition is useful in the manufacture of carpet yarns.

EXAMPLE IX

A polyamide is prepared from molar equivalent amounts of benzidine and isophthalic acid. Two parts by weight of this polyamide is melt blended with 3 parts by weight of a copolyester having 90 mole percent poly(ethylene terephthalate) units and 10 mole percent poly(ethylene isophthalate) units. The polyester-polyamide blend can be melt spun into fibers having high modulus, good fatigue resistance, and good dyeability with disperse and premetallized dyes.

EXAMPLE X

A polyamide is prepared by addition of 7.14 g. (0.03 mole) of 4-chloroisophthaloyl chloride in 5 minutes to a solution of 3.24 g. (0.03 mole) of m-phenylenediamine in 100 ml. of dimethyl acetamide. The solution is initially at 0° C. but after 10 minutes of stirring is allowed to warm up to room temperature and stirred for one hour. The polyamide is isolated by pouring the polymer solution into water to precipitate the polymer in a finely divided state. It is washed thoroughly and then dried in a vacuum oven at 100° C. Seven grams of the dried polyamide powder is dispersed in 15 g. of dry poly(ethylene terephthalate) by stirring the powder into a melt of poly(ethylene terephthalate) at 285° C. Fibers spun from this polyester-polyamide blend dye to deep shades with disperse and premetallized dyes.

EXAMPLE XI

The following polyesters are prepared by the usual procedure of heating the dialkyl ester of the dicarboxylic acid with a 30 to 100 percent excess of the diol in the presence of an ester interchange catalyst, followed by removal of the excess diol under reduced pressure to form a high-molecular-weight polyester:

The following polyamides are prepared from the acid chlorides and diamines by the procedure described in Example X.

| Polyamide | Polyamide Intermediates | | Polyamide Inherent Viscosity |
|---|---|---|---|
| | Dicarboxylic Acid Chloride Component | Diamine Components | |
| H | Terephthaloyl chloride. | N,N'-dimethyl-4,4'-methylenedianiline. | 0.58 |
| I | do | N,N'-diethyl-3,3'-dimethyl-4,4'-diphenylamine. | 0.71 |
| J | Sebacoyl chloride | 4,6-dimethyl-m-phenylenediamine. | 0.83 |
| K | Isophthaloyl chloride | m-Phenylenediamine | 0.92 |

Each of polyamides H, I, J and K are blended with each of polyesters A, B, C, D, E, F, and G by stirring 25 weight percent, in each case, of the polyamide into the melted polyester for a period of 30 minutes. The polyamides and polyesters are thoroughly dried before blending. Each of the polyester-polyamide blends are characterized by a lack of chemical interaction between the two, and a substantial increase in dyeability with disperse and premetallized dyes and an increase in modulus and resistance to fatigue of the blend compared with the unmodified polyester.

EXAMPLE XII

A copolyamide is prepared from 1.0 mole of m-aminobenzoic acid, 0.5 mole of pimelic acid and 0.4 mole of 3,3'-dimethyl-4,4'-methylenebisaniline. It is terminated with carboxyl groups. Fifty parts of the polyamide is blended with 50 parts of poly(ethylene terephthalate) at 275° in the melt to give a segmented poly(esteramide). Fibers made from the blend are useful as tire cord.

The invention has been described in detail with particular reference to preferred embodiments thereof, but it will be understood that variations and modifications can be effected within the spirit and scope of the invention as described hereinabove and as defined in the appended claims.

We claim:
1. A composition of matter comprising a blend of a fiber forming polyester component and from about 1–50 weight percent, based on the weight of the total composition, of a polyamide component containing substantially only amino terminal groups, wherein the polyamide component consists essentially of 2,4-diaminotoluene and a material selected from the group of acids consisting of adipic, suberic, terephthalic, isophthalic, azelaic, sebacic, 1,2-dodecanedicarboxylic and mixtures thereof.
2. A fiber prepared from the composition of claim 1.

| Polyester | Polyester Intermediate | | | Polyester Inherent Viscosity |
|---|---|---|---|---|
| | Dicarboxylic Acid Component | Diol Component | Catalyst Used | |
| A | Dibutyl carbonate | 2,2,4,4-tetramethyl-1,3-cyclobutanediol | Li metal | 0.68 |
| B | Dimethyl terephthalate | do | Bu₂SnO | 0.73 |
| C | Dimethyl 1,6-naphthalene dicarboxylate | Ethylene glycol | Ti(O iso Pr)₄ | 0.59 |
| D | 90% dimethyl terephthalate+10% dimethyl hexahydroterephthalate. | 1,4-cyclohexanedimethanol | Ti(O iso Pr)₄ | 0.84 |
| E | Dibutyl 4,4'-sulfonyldibenzoate | 1,5-pentanediol | Ti(O iso Pr)₄ | 0.66 |
| F | Dibutyl 4,4'-diphenate | 1,4-butanediol | MgH(Ti O iso Pr)₆ | 0.65 |
| G | Dimethyl 4,4'-ethylene-dioxydibenzoate | Ethylene glycol | Zn(OAc)₂+Sb₂O₃ | 0.68 |

References Cited

UNITED STATES PATENTS

| | | | |
|---|---|---|---|
| 2,244,192 | 6/1941 | Flory | 260—78 |
| 3,369,057 | 2/1968 | Twilley | 260—857 |
| 3,378,055 | 4/1968 | Robertson | 260—857 |
| 3,378,056 | 4/1968 | Robertson | 260—857 |
| 3,378,602 | 4/1968 | Robertson | 260—857 |
| 3,382,305 | 5/1968 | Breen | 260—857 |
| 3,386,967 | 6/1968 | Twilley | 260—857 |

PAUL LIEBERMAN, Primary Examiner

U.S. Cl. X.R.

260—75, 78